United States Patent
Shinozaki et al.

(10) Patent No.: US 12,226,825 B2
(45) Date of Patent: Feb. 18, 2025

(54) BUFFER CHAMBER AND AM SYSTEM INCLUDING A BUFFER CHAMBER

(71) Applicant: EBARA CORPORATION, Tokyo (JP)

(72) Inventors: Hiroyuki Shinozaki, Tokyo (JP); Junki Asai, Tokyo (JP); Yoshitaka Mukaiyama, Tokyo (JP)

(73) Assignee: EBARA CORPORATION, Tokyo (JP)

( * ) Notice: Subject to any disclaimer, the term of this patent is extended or adjusted under 35 U.S.C. 154(b) by 85 days.

(21) Appl. No.: 18/248,091

(22) PCT Filed: Sep. 14, 2021

(86) PCT No.: PCT/JP2021/033680
§ 371 (c)(1),
(2) Date: Apr. 6, 2023

(87) PCT Pub. No.: WO2022/080064
PCT Pub. Date: Apr. 21, 2022

(65) Prior Publication Data
US 2024/0001448 A1    Jan. 4, 2024

(30) Foreign Application Priority Data
Oct. 16, 2020  (JP) .................................. 2020-174652

(51) Int. Cl.
*B33Y 30/00* (2015.01)
*B22F 10/28* (2021.01)
(Continued)

(52) U.S. Cl.
CPC .............. *B22F 12/38* (2021.01); *B22F 10/28* (2021.01); *B22F 10/322* (2021.01); *B22F 12/70* (2021.01); *B33Y 30/00* (2014.12)

(58) Field of Classification Search
None
See application file for complete search history.

(56) References Cited

U.S. PATENT DOCUMENTS

| | | | |
|---|---|---|---|
| 5,658,412 A | 8/1997 | Retallick et al. | |
| 2012/0052145 A1* | 3/2012 | Chen ...................... | B22F 10/73 425/217 |

(Continued)

FOREIGN PATENT DOCUMENTS

| | | | |
|---|---|---|---|
| CN | 106926461 A | * | 7/2017 |
| EP | 1793979 | | 6/2007 |

(Continued)

OTHER PUBLICATIONS

International Search Report dated Nov. 30, 2021 issued in PCT/JP2021/033680.
Written Opinion dated Nov. 30, 2021 issued in PCT/JP2021/033680.

*Primary Examiner* — Mohammad M Ameen
(74) *Attorney, Agent, or Firm* — Chrisman Gallo Tochtrop LLC

(57) ABSTRACT

The present invention constructs, in an AM system, such an environment that fine particles are prevented from scattering from an area where the fine particles such as a powder material can be present to another area. According to one aspect, an AM system configured to manufacture a fabrication object is provided. This AM system includes a fabrication chamber in which an AM apparatus is disposed, and a buffer chamber in communication with the fabrication chamber. The buffer chamber includes an entrance in communication with a surrounding environment, an exit in communication with the fabrication chamber, a grating floor, and an exhaust port. The AM system further includes a first gate configured to be able to open and close the entrance of the buffer chamber, and a second gate configured to be able to open and close the exit of the buffer chamber.

10 Claims, 5 Drawing Sheets

(51) Int. Cl.
*B22F 10/322* (2021.01)
*B22F 12/00* (2021.01)
*B22F 12/70* (2021.01)

(56) References Cited

U.S. PATENT DOCUMENTS

2015/0314389 A1* 11/2015 Yamada ................ B29C 64/232
                                                                219/76.1
2018/0304529 A1* 10/2018 Herzog .................... B22F 3/24
2019/0054686 A1     2/2019 Herzog et al.

FOREIGN PATENT DOCUMENTS

| | | |
|---|---|---|
| JP | 2015-193187 A | 11/2015 |
| JP | 2018-515372 A | 6/2018 |
| JP | 2018-525523 A | 9/2018 |
| JP | 2018-535320 A | 11/2018 |
| WO | 9415771 | 7/1994 |
| WO | 2006024373 | 3/2006 |
| WO | 2017/075258 A1 | 5/2017 |

* cited by examiner

BUFFER CHAMBER AND AM SYSTEM INCLUDING A BUFFER CHAMBER

TECHNICAL FIELD

The present application relates to a buffer chamber and an AM system including a buffer chamber. The present application claims priority under the Paris Convention to Japanese Patent Application No. 2020-174652 filed on Oct. 16, 2020. The entire disclosure of Japanese Patent Application No. 2020-174652 including the specification, the claims, the drawings, and the abstract is incorporated herein by reference in its entirety.

BACKGROUND ART

There are known techniques for directly fabricating a three-dimensional object based on three-dimensional data present on a computer that expresses the three-dimensional object. Known examples thereof include the Additive Manufacturing (AM) technique. As one example thereof, Direct Energy Deposition (DED) is available as the AM technique employing the deposition method. DED is a technique that carries out fabrication by melting and solidifying a metal material together with a base material using an appropriate heat source while supplying the metal material locally. Further, Powder Bed Fusion (PBF) is available as one example of the AM technique. In PBF, each layer of the three-dimensional object is fabricated by, toward metal powder two-dimensionally deposited all over a surface, irradiating a portion thereof to be fabricated with a laser beam or an electron beam serving as a heat source, and melting and solidifying or sintering the metal powder. In PBF, the desired three-dimensional object can be fabricated by repeating such a process.

CITATION LIST

Patent Literature

PTL 1: Japanese Unexamined Patent Application Publication (Translation of PCT Application) No. 2018-535320

SUMMARY OF INVENTION

Technical Problem

Fine particles such as metal powder are often used as a fabrication material by AM apparatuses regardless of whether they employ the DED method or the PBF method. Further, the AM apparatuses may use a reel-like line material as the fabrication material instead of the powder material, but fine particles such as fume are generated when the material is melted. Fine particles are easily inhaled by humans, and, further, may be influential on health depending on the type of fine particles. On the AM apparatuses, a fabrication plate serving as a fabrication plane may be installed manually by a worker onto a stage set up for the fabrication manually by a worker and the fabrication object may be extracted after the fabrication. The work of replenishing the powder material into a powder supply device before the fabrication and the work of extracting the fabrication object with the material powder remaining thereon after the fabrication involve a risk that the worker may inhale the fine particles.

For this reason, the AM apparatuses using the powder material raise the necessity of working while wearing protective gear, protective gloves, and a protective mask when engaging in work that involves handling the powder material. It is desirable to allow the powder material to be replenished and the fabrication object to be brought into and out of a fabrication chamber without requiring the worker to directly access the fabrication chamber so as to reduce the risk that the worker may be exposed to the fine particles. Further, it is desirable to construct such an environment that the fine particles are prevented from scattering from an area where the fine particles such as the powder material can be present to another area. One of objects of the present application is to provide a structure capable of solving or alleviating at least a part of these problems.

Solution to Problem

According to one aspect, an AM system configured to manufacture a fabrication object is provided. This AM system includes a fabrication chamber in which an AM apparatus is disposed, and a buffer chamber in communication with the fabrication chamber. The buffer chamber includes an entrance in communication with a surrounding environment, an exit in communication with the fabrication chamber, a grating floor, and an exhaust port. The AM system further includes a first gate configured to be able to open and close the entrance of the buffer chamber, and a second gate configured to be able to open and close the exit of the buffer chamber.

DESCRIPTION OF EMBODIMENTS

Figure 1:
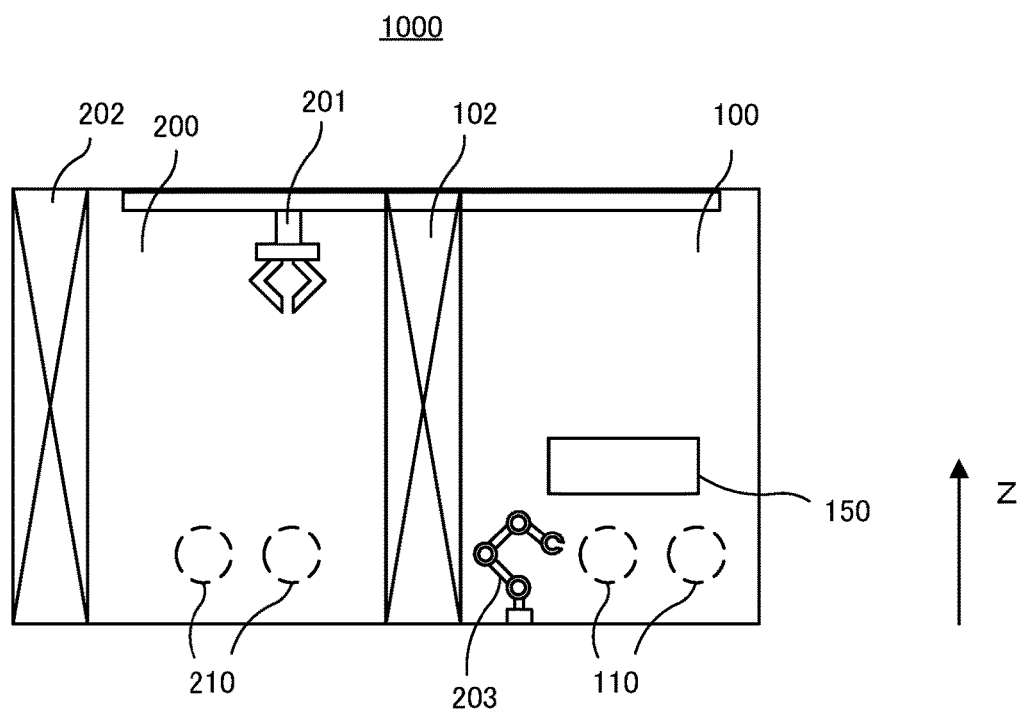
FIG. 1 is a diagram schematically illustrating an AM system according to one embodiment.

In the following description, embodiments of a buffer chamber and an AM system including a buffer chamber according to the present invention will be described with reference to the attached drawings. In the attached drawings, identical or similar components will be indicated by identical or similar reference numerals, and redundant descriptions regarding the identical or similar components may be omitted in the description of each of the embodiments. Further, features described in each of the embodiments are also applicable to other embodiments in so far as they do not contradict each other.

FIG. 1 is a diagram schematically illustrating an AM system 1000 according to one embodiment. An arrow z illustrated in FIG. 1 indicates the height direction. The AM system 1000 illustrated in FIG. 1 includes a fabrication chamber 100 and a buffer chamber 200. A gate 102 is provided between the fabrication chamber 100 and the buffer chamber 200, and the fabrication chamber 100 and the buffer chamber 200 are isolated by the gate 102. The gate 102 is provided on the entrance side of the fabrication chamber 100 and the exit side of the buffer chamber 200. A gate 202 is provided on the entrance side of the buffer chamber 200, and the buffer chamber 200 and the surrounding environment are isolated by the gate 202. The system 1000 illustrated in FIG. 1 is configured in such a manner that goods can be brought into and out of the fabrication chamber 100 only via the buffer chamber 200. The gates 102 and 202 can be, for example, slide-type doors slidable across or out-swing or in-swing doors. Using the slide-type doors as the gates 102 and 202 makes the AM system 1000 insusceptible to the influence of a differential pressure. Especially, the buffer chamber 200 should have a lower pressure therein than the surrounding environment as will be described below, and becomes insusceptible to the influence of the differential pressure if the slide-type door is used as the gate 202 isolating the surrounding environment and the buffer chamber 200.

In one embodiment, the AM system 1000 may include a sensor for detecting the opening/closing state of the gate 102/202 and a lock mechanism that keeps the gate 102/202 in a closed state. For example, the fabrication chamber 100 can be prevented from being directly exposed to the surrounding environment by controlling the AM system 1000 so as to allow the gate 202 to be opened only when the gate 102 is in the closed state and allow the gate 102 to be opened only when the gate 202 is in the closed state.

An AM apparatus 150 for carrying out AM fabrication is disposed in the fabrication chamber 100. The AM apparatus 150 includes a device that supplies a powder material, a heat source such as a laser source or an electron beam source, a gas source, various kinds of operation mechanisms, a control device, and the like. The AM apparatus 150 may be any of an AM apparatus employing the DED method and an AM apparatus employing the PBF method. An arbitrary AM apparatus including conventional techniques can be used as the AM apparatus. An arbitrary AM apparatus can be used as the AM apparatus 150, and therefore the details thereof will not be described herein.

In the AM system 1000 illustrated in FIG. 1, fabrication preparation, fabrication processing by the AM apparatus 150, and post-fabrication processing are performed in the fabrication chamber 100. The fabrication preparation includes, for example, replenishing a fabrication material such as the powder material to a predetermined material supply device, setting up a base plate for the fabrication on the AM apparatus 150, and installing various kinds of replacement components used with the AM apparatus. The fabrication processing includes predetermined fabrication by the AM apparatus 150 under automatic control by a computer. The post-fabrication processing includes, for example, removing the remaining powder material and the like, extracting a fabrication object, and cleaning the fabrication chamber.

In one embodiment, gloves 110 and 210 are disposed on wall surfaces of the fabrication chamber 100 and the buffer chamber 200, respectively, as illustrated in FIG. 1. The gloves 110 and 210 extend from the wall surfaces of the fabrication chamber 100 and the buffer chamber 200 inward, respectively, and make the insides of the fabrication chamber 100 and the buffer chamber 200 accessible from outside the fabrication chamber 100 and the buffer chamber 200, respectively. The gloves 110 and 210 allow manual work to be performed in the fabrication chamber 100 and the buffer chamber 200 from outside the fabrication chamber 100 and the buffer chamber 200. For example, a worker can perform work of bringing a container containing the powder material into the fabrication chamber 100 via the buffer chamber 200 and loading the powder material into the powder supply device of the AM apparatus 150 via the gloves 110 in a sealingly closed state with the gate 102 closed. The empty container in which the powder material had been contained can be extracted by moving the empty container to the buffer chamber 200 via the gate 102 and opening the gate 202 after closing the gate 102.

In one embodiment, a movement mechanism 201 such as a crane operatable across the fabrication chamber 100 and the buffer chamber 200, a robot 203 that operates inside the fabrication chamber 100 and the buffer chamber 200, and/or the like can be disposed instead of or in addition to the gloves 110 and 210 illustrated in FIG. 1. Using the movement mechanism 201 and/or the robot 203 allows various kinds of work such as the replenishment of the material and the attachment/detachment of a component to be performed inside the fabrication chamber 100 and the buffer chamber 200 with the fabrication chamber 100 and the buffer chamber 200 kept in the sealingly closed state. The crane is located in the buffer chamber 200 in FIG. 1, but the movement mechanism 201 can be configured movably across the fabrication chamber 100 and the buffer chamber 200 by laying a rail for moving the crane therealong across the fabrication chamber 100 and the buffer chamber 200. Further, the robot 203 is located in the fabrication chamber 100 in FIG. 1, but the robot 203 may be configured movably across the fabrication chamber 100 and the buffer chamber 200, and, further, may include a hand accessible to both the fabrication chamber 100 and the buffer chamber 200 with the gate 102 opened.

Figure 2:
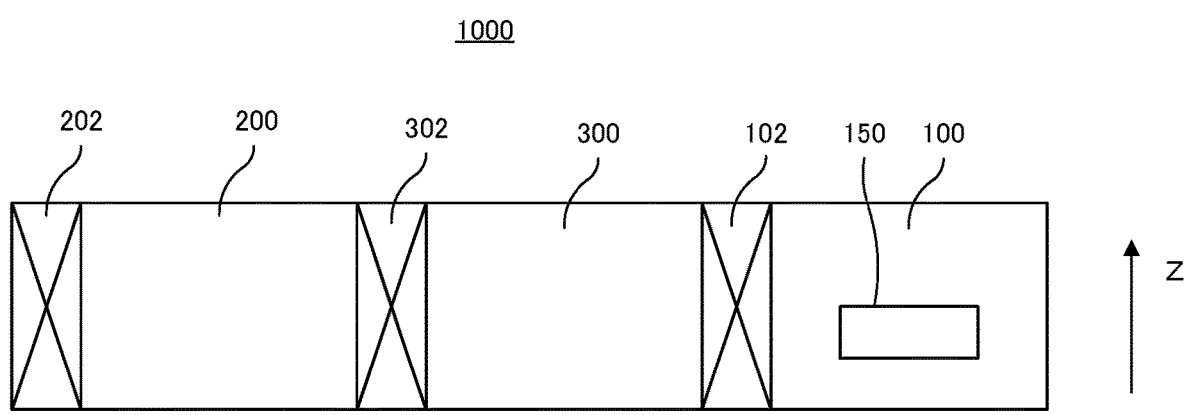
FIG. 2 is a diagram schematically illustrating the AM system according to one embodiment.

FIG. 2 is a diagram schematically illustrating the AM system 1000 according to one embodiment. The AM system 1000 according to the embodiment illustrated in FIG. 2 includes a fabrication preparation chamber 300 disposed between the fabrication chamber 100 and the buffer chamber 200 illustrated in FIG. 1. In the embodiment illustrated in FIG. 2, a gate 302 is provided between the exit of the buffer chamber 200 and the entrance of the fabrication preparation chamber 300, and the gate 102 is provided between the exit of the fabrication preparation chamber 300 and the entrance of the fabrication chamber 100. In the illustrated AM system 1000, the fabrication processing is performed in the fabrication chamber 100, and the fabrication preparation or the like is performed in the fabrication preparation chamber 300. Goods are brought into and out of the fabrication chamber 100 via the buffer chamber 200 and the fabrication preparation chamber 300. In the embodiment illustrated in FIG. 2, the gloves 110 and 210, the movement mechanism 201, the robot 203, and the like described with reference to FIG. 1 can be provided in any of the fabrication chamber 100, the buffer chamber 200, and the fabrication preparation chamber 300.

Figure 3:
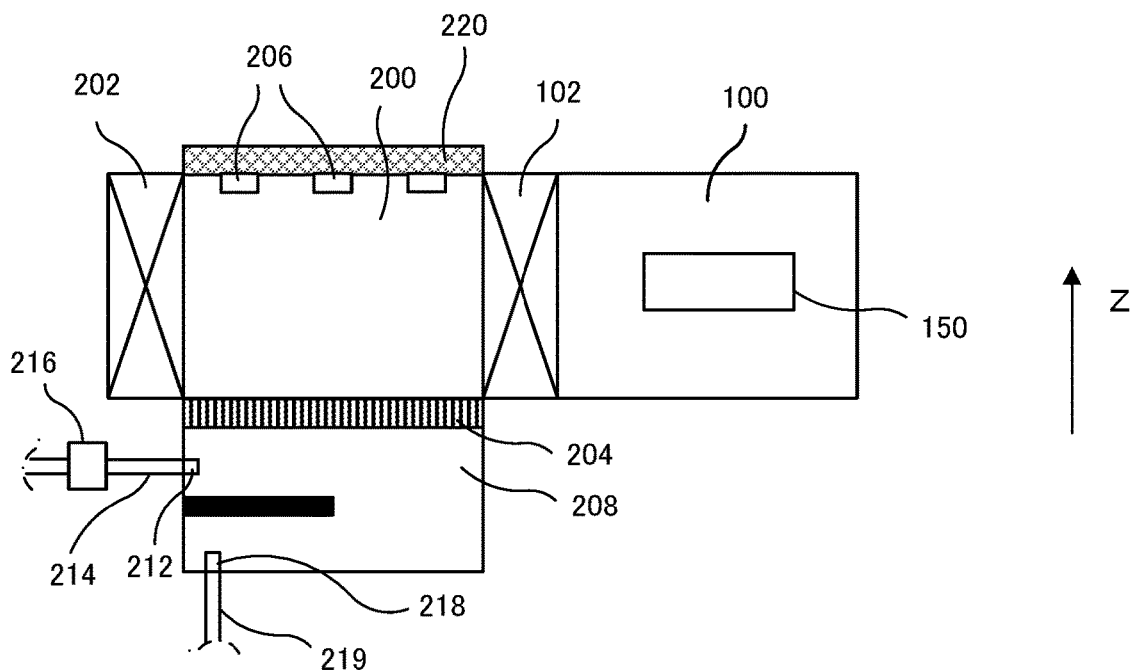
FIG. 3 is a diagram schematically illustrating the AM system according to one embodiment.

FIG. 3 is a diagram schematically illustrating the AM system 1000 according to one embodiment. The AM system 1000 illustrated in FIG. 3 includes the fabrication chamber 100 in which the AM apparatus 150 is disposed, and the buffer chamber 200, similarly to the embodiment illustrated in FIG. 1. In the embodiment illustrated in FIG. 3, the buffer chamber 200 includes a grating floor 204. The grating floor 204 is a grid-like floor or a floor with a large number of through-holes formed thereon. The grating floor 204 may be laid over the entire floor surface of the buffer chamber 200 or may be laid on a part of the floor surface of the buffer chamber 200. The buffer chamber 200 illustrated in FIG. 3 includes a humidifier 206. The humidifier 206 is a device for supplying mist or water into the buffer chamber 200. The buffer chamber 200 illustrated in FIG. 3 includes the humidifier 206, thereby being able to reduce scattering fine particles such as the powder material in the buffer chamber 200.

In the buffer chamber 200 according to one embodiment, a steam-water separator 208 is disposed below the grating floor 204 of the buffer chamber 200 as illustrated in FIG. 3. The steam-water separator 208 can separate a mixture of gas and liquid introduced into the steam-water separator 208 into gas and liquid, and discharge them separately. The buffer chamber 200 according to the embodiment illustrated in FIG. 3 includes the grating floor 204, and therefore the fine particles such as the powder material scattering in the buffer chamber 200 are moved to the steam-water separator 208 disposed below the grating floor 204 due to the gravitational effect and the function of an exhaust mechanism, which will be described below. Further, in the case of the embodiment in which the humidifier 206 is provided in the buffer chamber 200, floating fine particles can be caught by moisture and moved to the steam-water separator 208 below the grating floor 204.

The steam-water separator 208 includes an exhaust port 212. An exhaust line 214 is connected to the exhaust port 212. A dust collector 216 is provided to the exhaust line 214. Further, the steam-water separator 208 includes a drainage port 218. A drainage line 219 is connected to the drainage port 218. After the liquid passes through the drainage line 219, liquid therein is transported to a drainage treatment plant and a solid therein is collected for recycling or the like via a solid-liquid separator.

The buffer chamber 200 according to one embodiment includes an intake port 220 for introducing gas into the buffer chamber 200. The intake port 220 introduces outside air into the buffer chamber 200 via a filter and/or a valve. The intake port 220 is provided on the upper surface of the buffer chamber 200 in FIG. 3, but the intake port 220 may be provided on a side surface of the buffer chamber 200.

The buffer chamber 200 according to one embodiment can adjust the pressure in the buffer chamber 200 by adjusting an exhaust amount via the exhaust port 212 and the exhaust line 214 and an intake amount introduced from the intake port 220. In one embodiment, desirably, the air pressure in the buffer chamber 200 is controlled in such a manner that the air is directed from the entrance of the buffer chamber 200 toward the inner side of the buffer chamber 200 at a flow velocity equal to or higher than 0.3 m/s and equal to or lower than 1.3 m/s, when the gate 202 is opened with the gate 102 closed. The fine particles floating in the buffer chamber 200 can be prevented from scattering around from the entrance of the buffer chamber 200 by causing the air to be directed from the entrance of the buffer chamber 200 toward the inner side of the buffer chamber 200 when the gate 202 is opened. However, if the air flows from the entrance of the buffer chamber 200 toward the inner side of the buffer chamber 200 at a high flow velocity, this leads to whirling up the fine particles in the buffer chamber 200, and therefore it is desirable not to reduce the air pressure in the buffer chamber 200 too much. Preferably, it is desirable to control the air pressure in the buffer chamber 200 in such a manner that the air is directed from the entrance of the buffer chamber 200 toward the inner side of the buffer chamber 200 at a flow velocity of approximately 1 m/s. The adjustment of the air pressure in the buffer chamber 200 can be achieved by, for example, adjusting the exhaust amount exhausted from the exhaust line 214 or the amount of outside air introduced from the intake port 220.

In the AM system 1000 illustrated in FIG. 3, first, the gate 202 is closed when the gate 102 is planned to be opened. If the pressure difference is large between the fabrication chamber 100 and the buffer chamber 200 when the gate 102 is opened, this causes a great airflow, thereby leading to whirling up the fine particles. For this reason, an adjustment is made in such a manner that the pressures approximately match each other between the buffer chamber 200 and the fabrication chamber 100 after the gate 202 is closed. More specifically, the exhaust amount from the exhaust line 214 or the opening degree of the valve of the intake port 220 is adjusted so as to allow the pressures to approximately match each other between the buffer chamber 200 and the fabrication chamber 100. After that, the gate 202 is opened, and, for example, goods can be moved between the buffer chamber 200 and the fabrication chamber 100.

The gloves 110 and 210, the movement mechanism 201, the robot 203, and the like illustrated in FIG. 1 may also be provided in the buffer chamber 200 according to the embodiment illustrated in FIG. 3 although they are not illustrated in FIG. 3. Further, the exit of the buffer chamber 200 is located adjacent to the entrance of the fabrication chamber 100 in the embodiment illustrated in FIG. 3, but the fabrication preparation chamber 300 may be provided between the buffer chamber 200 and the fabrication chamber 100 as illustrated in FIG. 2.

Figure 4:
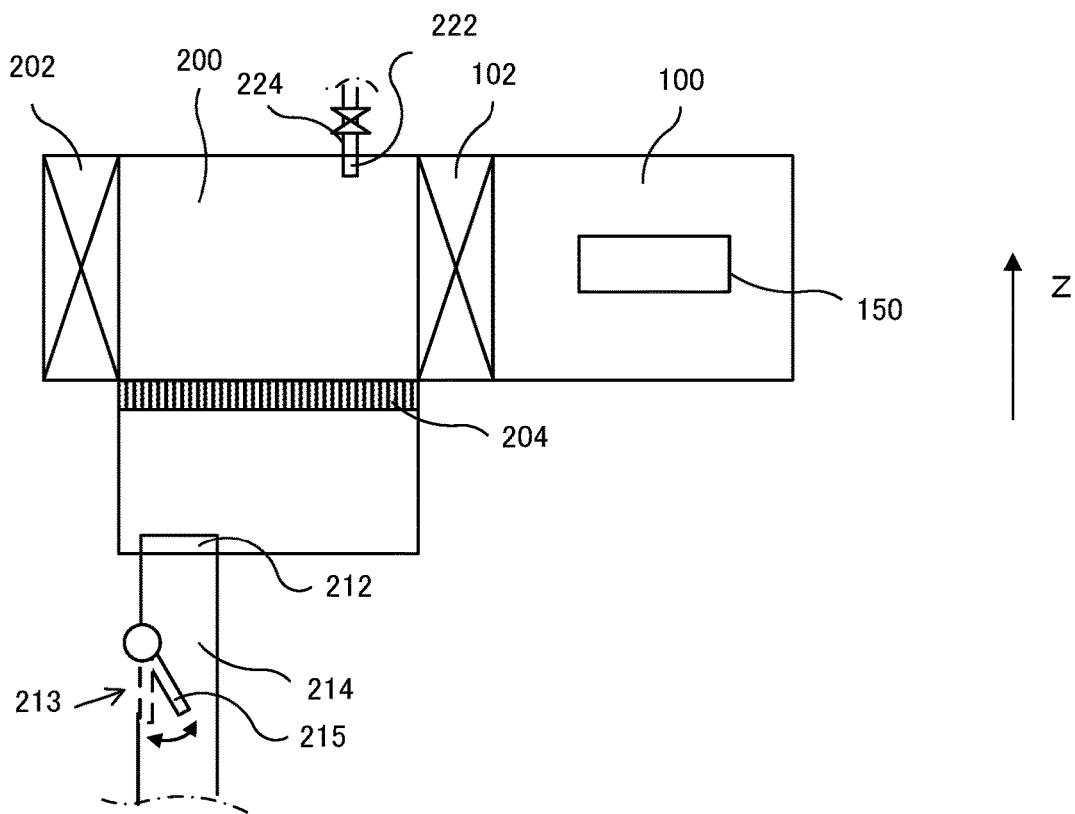
FIG. 4 is a diagram schematically illustrating the AM system according to one embodiment.

FIG. 4 is a diagram schematically illustrating the AM system 1000 according to one embodiment. The AM system 1000 illustrated in FIG. 4 includes the fabrication chamber 100 in which the AM apparatus 150 is disposed, and the buffer chamber 200, similarly to the embodiment illustrated in FIG. 1. The buffer chamber 200 illustrated in FIG. 4 includes the grating floor 204, the exhaust port 212, and the exhaust line 214 similarly to the buffer chamber 200 illustrated in FIG. 3.

In the embodiment illustrated in FIG. 4, the exhaust line 214 includes an opening 213, and a movable damper 215 capable of opening and closing the opening 213. The movable damper 215 includes a movable member rotationally movable about a shaft provided on the wall surface of the exhaust line 214. The movable member of the movable damper 215 is configured to close the opening 213 under the gravitational effect. The embodiment illustrated in FIG. 4 includes the opening 213 and the movable damper 215 provided to the exhaust line 214, thereby being able to adjust the air pressure in the buffer chamber 200 appropriately. If the air pressure in the buffer chamber 200 reduces when, for example, the gate 102 and the gate 202 are closed, the outside air pressure causes the movable damper 215 to rotate toward the inner side of the exhaust line 214 to open the opening 213, and the outside air flows into the exhaust line 214 via the opening 213. If the air pressure in the buffer chamber 200 is in a state close to the outside air pressure when, for example, the gate 202 is opened, the movable member of the movable damper 215 closes the opening 213 under the gravitational effect. The air pressure in the buffer chamber 200 can be prevented from reducing too much due to the movable damper 215.

Further, in the embodiment illustrated in FIG. 4, the buffer chamber 200 includes an intake port 222 for introducing inert gas into the buffer chamber 200 and an inert gas supply line 224 connected to the intake port 222. In the embodiment illustrated in FIG. 4, the oxygen concentration in the buffer chamber 200 can be reduced by introducing the inert gas from the inert gas supply line 224 into the buffer chamber 200. In the fabrication using the AM apparatus 150, the fabrication may be carried out under an inert gas atmosphere with the oxygen concentration reduced to prevent oxidation when the powder material or the like is heated to be melted and solidified. Therefore, it is desirable to create the inert gas atmosphere with the oxygen concentration reduced therein in advance in the fabrication chamber 100. The embodiment illustrated in FIG. 4 allows the inert gas atmosphere to be created in the buffer chamber 200 adjacent to the fabrication chamber 100, thereby being able to maintain the inert gas atmosphere in the fabrication chamber 100 even when the gate 102 is opened. An arbitrary feature described in the other embodiments can be combined with the AM system 1000 according to the embodiment illustrated in FIG. 4.

Figure 5:
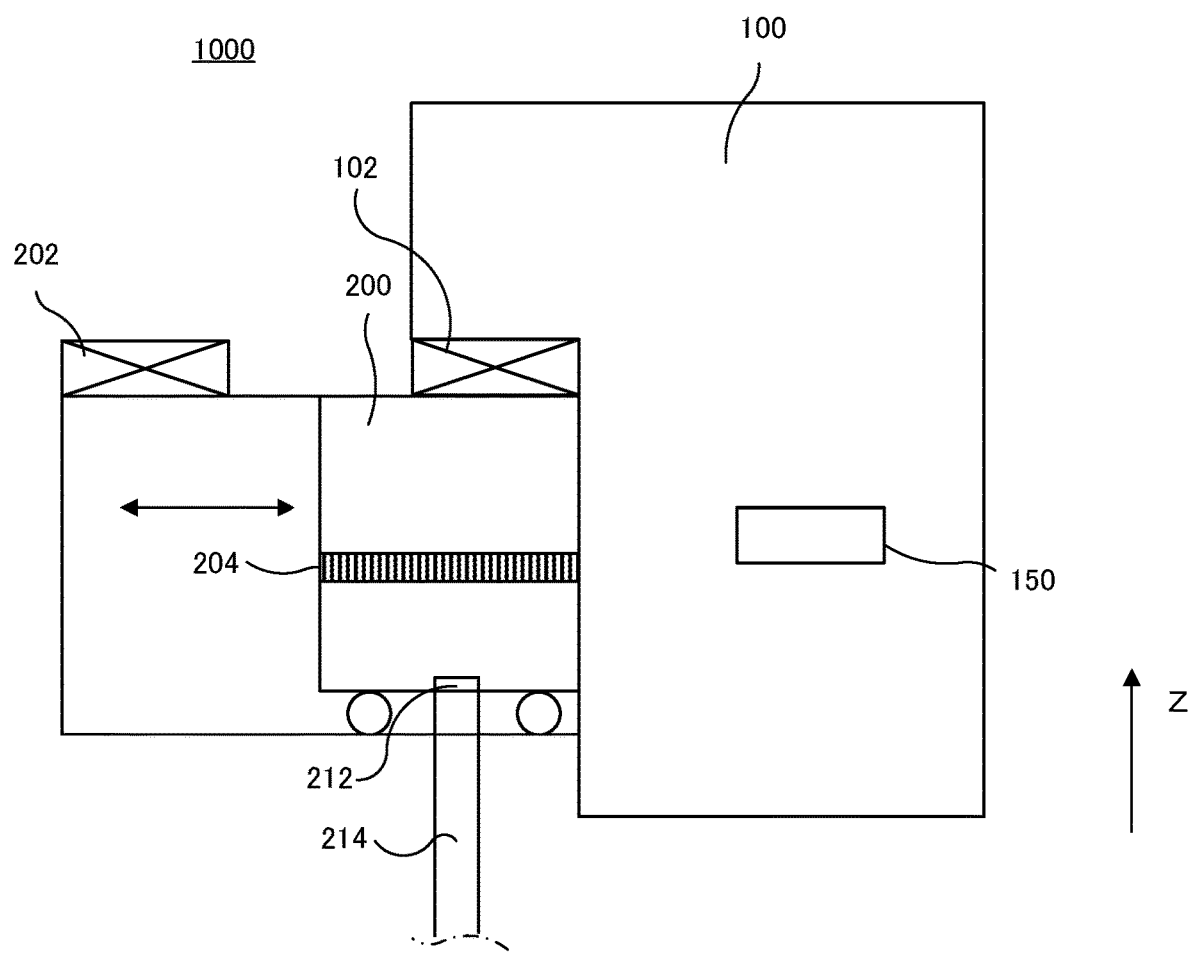
FIG. 5 is a diagram schematically illustrating the AM system according to one embodiment.

FIG. 5 is a diagram schematically illustrating the AM system 1000 according to one embodiment. The buffer chamber 200 according to the embodiment illustrated in FIG. 5 is movable. As illustrated in FIG. 5, the buffer chamber 200 is movable between a first position, at which the buffer chamber 200 is connected to the gate 102 but is disconnected from the gate 202, and a second position, at which the buffer chamber 200 is connected to the gate 202 but is disconnected from the gate 102. For example, when the fabricated fabrication object is extracted, the fabrication object can be extracted by moving the buffer chamber 200 to the first position, opening the gate 102, and moving the fabrication object from the fabrication chamber 100 to the buffer chamber 200, and, after that, closing the gate 102, moving the buffer chamber 200 to the second position, and opening the gate 202. When goods are brought into the fabrication chamber 100, goods can be brought into the fabrication chamber 100 by moving the buffer chamber 200 to the second position, opening the gate 202, placing the goods into the buffer chamber 200, closing the gate 202, moving the buffer chamber 200 to the first position, and opening the gate 102. In the embodiment illustrated in FIG. 5, the buffer chamber 200 is not connected to both the gate 102 and the gate 202 at the same time, and therefore the fabrication chamber 100 is prevented from being exposed to the surrounding environment via the buffer chamber 200 by mistake. An arbitrary feature described in the other embodiments can be combined with the AM system 1000 according to the embodiment illustrated in FIG. 5.

Figure 6:
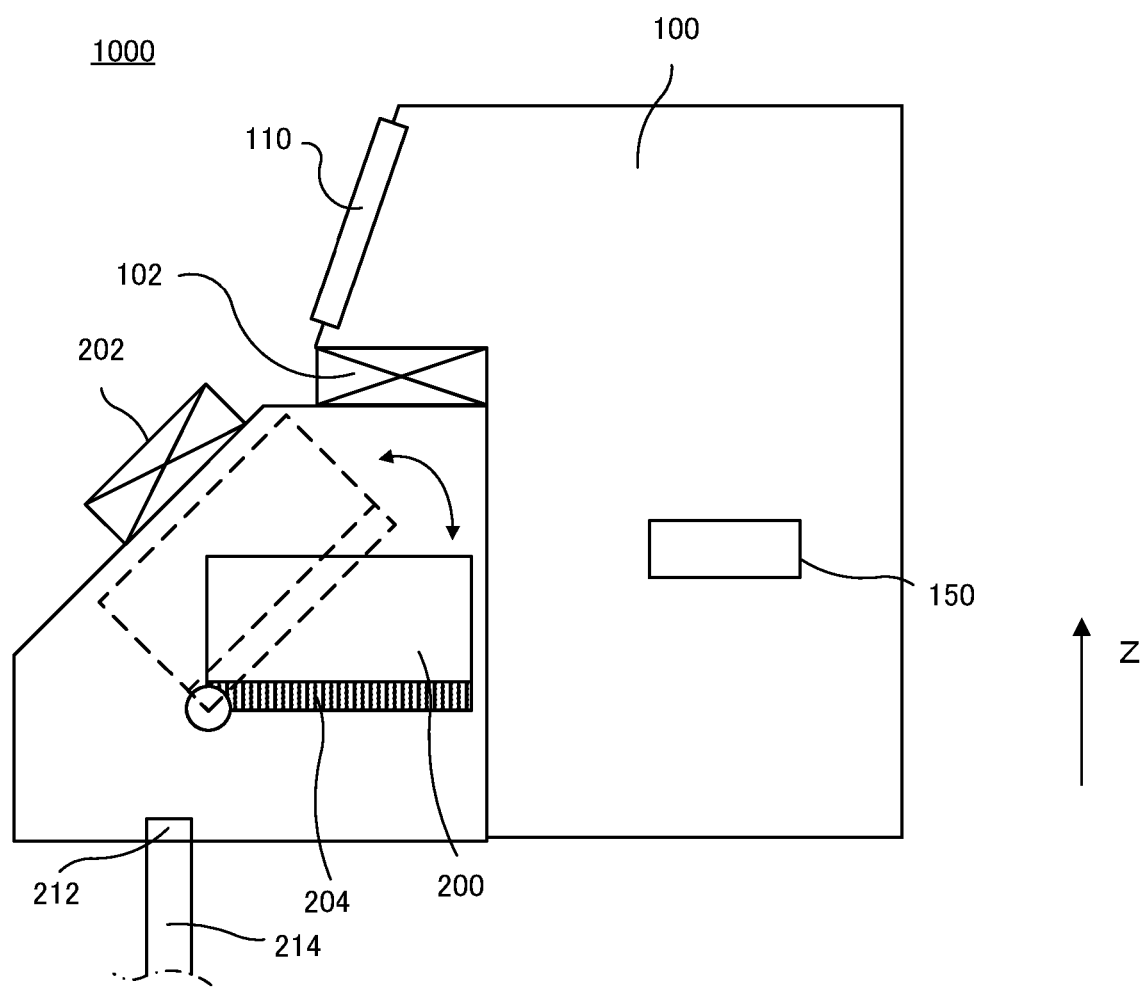
FIG. 6 is a diagram schematically illustrating the AM system according to one embodiment.

FIG. 6 is a diagram schematically illustrating the AM system 1000 according to one embodiment. In the embodiment illustrated in FIG. 6, the buffer chamber 200 is a box opened on the upper surface thereof, and is rotationally movable about a rotational shaft as illustrated in FIG. 6. The buffer chamber 200 illustrated in FIG. 6 is rotationally movable between a first position (indicated by a solid line in FIG. 6), at which the buffer chamber 200 is accessible from the fabrication chamber 100 via the gate 102, and a second position (illustrated in a broken line in FIG. 6), which allows goods to be brought into and out of the buffer chamber 200 via the gate 202. As illustrated in FIG. 6, the glove 110 is disposed on the wall surface of the fabrication chamber 100. When the buffer chamber 200 is located at the first position, the worker can access the buffer chamber 200 from the fabrication chamber 100 via the gate 102 using the glove 110, and can move goods between the fabrication chamber 100 and the buffer chamber 200. An arbitrary feature described in the other embodiments can be combined with the AM system 1000 according to the embodiment illustrated in FIG. 6.

Figure 7:
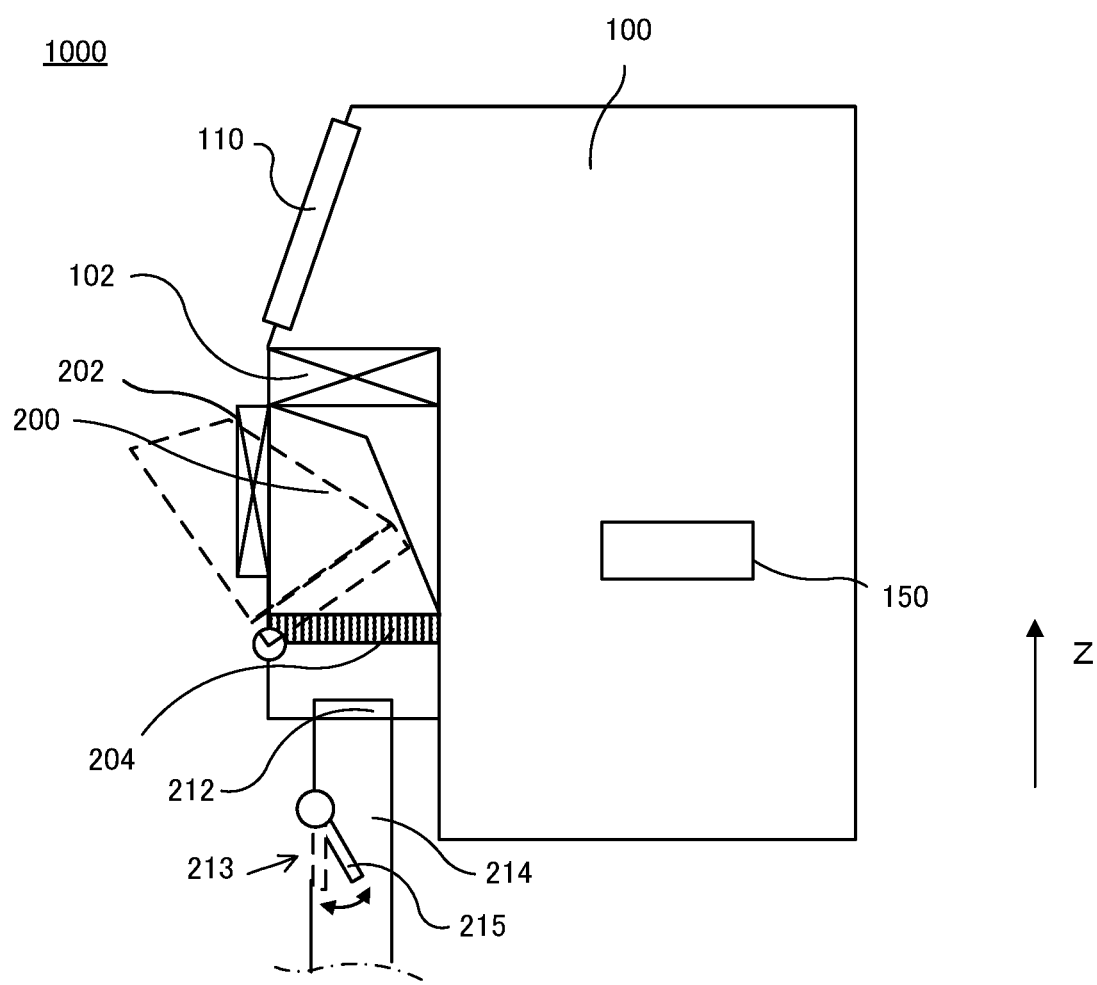
FIG. 7 is a diagram schematically illustrating the AM system according to one embodiment.

FIG. 7 is a diagram schematically illustrating the AM system 1000 according to one embodiment. In the embodiment illustrated in FIG. 7, the buffer chamber 200 is a box opened on the upper surface thereof, and is rotationally movable about a rotational shaft as illustrated in FIG. 7. The buffer chamber 200 illustrated in FIG. 7 is rotationally movable between a first position (indicated by a solid line in FIG. 7), at which the buffer chamber 200 is accessible from the fabrication chamber 100 via the gate 102, and a second position (illustrated in a broken line in FIG. 7), which allows goods to be brought into and out of the buffer chamber 200 via the gate 202. As illustrated in FIG. 7, the glove 110 is disposed on the wall surface of the fabrication chamber 100. When the buffer chamber 200 is located at the first position, the worker can access the buffer chamber 200 from the fabrication chamber 100 via the gate 102 using the glove 110, and can move goods between the fabrication chamber 100 and the buffer chamber 200. In the embodiment illustrated in FIG. 7, rotationally moving the buffer chamber 200 to the second position causes the opened upper surface of the buffer chamber 200 to be exposed, thereby allowing goods to be brought into and out of the buffer chamber 200. In the buffer chamber 200 illustrated in FIG. 7, the wall surface of the front side (the left side in FIG. 7) has a function as the gate 202. The upper surface is exposed when the buffer chamber 200 is rotationally moved to the second position, and the wall surface of the front side isolates the buffer chamber 200 from the surrounding environment when the buffer chamber 200 is located at the first position. In the buffer chamber 200 illustrated in FIG. 7, further, a slide-type door can be employed as the gate 202.

Each of the features described in the respective drawings of the above-described embodiments is also applicable to the other embodiments. For example, each of the gloves 110 and 210, the movement mechanism 201, and the robot 203 described with reference to FIG. 1 is also applicable to the other embodiments. Further, the sensor that detects the opening/closing state of each of the gates 102, 202, and 302, and the lock mechanism of each of the gates 102, 202, and 302 are also applicable to any of the embodiments. Further, the fabrication preparation chamber 300 described with reference to FIG. 2 can also be disposed between the buffer chamber 200 and the fabrication chamber 100 according to the other embodiments. Further, each of the grating floor 204, the humidifier 206, the steam-water separator 208, the dust collector 216, and the intake port 220 described with reference to FIG. 3 is also applicable to the other embodiments. The inert gas supply line 224 and the movable damper 215 described with reference to FIG. 4 are also applicable to the other embodiments. The movable buffer 200 described with reference to FIGS. 5 to 7 is also applicable to the other embodiments.

Further, the example in which one buffer chamber 200 is connected for each fabrication chamber 100 is illustrated in the above-described embodiments, but a plurality of buffer chambers 200 may be connected to the fabrication chamber 100 and/or a plurality of buffer chambers 200 may be connected to the fabrication preparation chamber 300. For example, a plurality of buffer chambers 200 may be connected to the fabrication chamber 100 and a specific buffer chamber 200 may be used as a dedicated buffer chamber 200 for moving a specific item. For example, the specific buffer chamber 200 can be used to supply the powder material or move the fabrication object with the powder material remaining thereon, and the other buffer chamber(s) 200 can be used to move goods other than the powder material. By being designed in this manner, the AM system 1000 can be configured in such a manner that the grating floor 204, the exhaust mechanism, the humidifier 206, and the like are provided only in the buffer chamber 200 used to move the powder material, and are omitted in the other buffer chamber (s) 200. Further, a plurality of buffer chambers 200 different in dimension may be connected to the fabrication chamber 100 for the purpose of moving goods different in size and/or weight.

At least the following technical ideas can be recognized from the above-described embodiments.

[Configuration 1] According to a configuration 1, an AM system configured to manufacture a fabrication object is provided. This AM system includes a fabrication chamber in which an AM apparatus is disposed, and a buffer chamber in communication with the fabrication chamber. The buffer chamber includes an entrance in communication with a surrounding environment, an exit in communication with the fabrication chamber, a grating floor, and an exhaust port. The AM system further includes a first gate configured to be able to open and close the entrance of the buffer chamber, and a second gate configured to be able to open and close the exit of the buffer chamber.

[Configuration 2] According to a configuration 2, the AM system according to the configuration 1 further includes an exhaust mechanism capable of controlling an exhaust amount of gas exhausted from the exhaust port.

[Configuration 3] According to a configuration 3, in the AM system according to the configuration 2, the exhaust mechanism is configured to control the exhaust amount in such a manner that air is directed from the entrance toward an inner side of the buffer chamber at a flow velocity equal to or higher than 0.3 m/s and equal to or lower than 1.3 m/s in a state that the first gate is opened.

[Configuration 4] According to a configuration 4, in the AM system according to the configuration 2 or 3, the exhaust mechanism includes a dust collector.

[Configuration 5] According to a configuration 5, in the AM system according to any one of the configurations 1 to 4, the buffer chamber includes an intake port configured to be used to introduce gas into the buffer chamber.

[Configuration 6] According to a configuration 6, in the AM system according to any one of the configurations 1 to 5, the buffer chamber includes a humidifier, and a steam-water separator disposed below the grating floor.

[Configuration 7] According to a configuration 7, the AM system according to any one of the configurations 1 to 6 further includes a glove on a wall surface of the buffer chamber, the glove being configured to be used to access from outside to inside the buffer chamber.

[Configuration 8] According to a configuration 8, the AM system according to any one of the configurations 1 to 7 further includes a movement mechanism configured to be used to move goods between the buffer chamber and the fabrication chamber.

[Configuration 9] According to a configuration 9, in the AM system according to any one of the configurations 1 to 8, the buffer chamber is connected to a gas supply line for supplying insert gas into the buffer chamber.

[Configuration 10] According to a configuration 10, in the AM system according to any one of the configurations 1 to 9, the buffer chamber is movable between a first position, at which the exit is in communication with the second gate, and a second position, at which the entrance is in communication with the first gate.

REFERENCE SIGNS LIST 100 fabrication chamber
102 gate
110 glove
150 AM apparatus
200 buffer chamber
201 movement mechanism
202 gate
203 robot
204 grating floor
206 humidifier
208 steam-water separator
212 exhaust port
213 opening
214 exhaust line
215 movable damper
216 dust collector
218 drainage port
219 drainage line
220 intake port
222 intake port
224 inert gas supply line
300 fabrication preparation chamber
302 gate
1000 AM system

What is claimed is:

1. An AM system configured to manufacture a fabrication object, the AM system comprising:
   a fabrication chamber in which an AM apparatus is disposed; and
   a buffer chamber in communication with the fabrication chamber,
   wherein the buffer chamber includes
   an entrance in communication with a surrounding environment,
   an exit in communication with the fabrication chamber,
   a grating floor, and
   an exhaust port,
   the AM system further comprising:
   a first gate configured to be able to open and close the entrance of the buffer chamber; and
   a second gate configured to be able to open and close the exit of the buffer chamber.

2. The AM system according to claim 1, further comprising an exhaust mechanism capable of controlling an exhaust amount of gas exhausted from the exhaust port.

3. The AM system according to claim 2, wherein the exhaust mechanism is configured to control the exhaust amount in such a manner that air is directed from the entrance toward an inner side of the buffer chamber at a flow velocity equal to or higher than 0.3 m/s and equal to or lower than 1.3 m/s in a state that the first gate is opened.

4. The AM system according to claim 2, wherein the exhaust mechanism includes a dust collector.

5. The AM system according to claim 1, wherein the buffer chamber includes an intake port configured to be used to introduce gas into the buffer chamber.

6. The AM system according to claim 1, wherein the buffer chamber includes a humidifier, and a steam-water separator disposed below the grating floor.

7. The AM system according to claim 1, further comprising a glove on a wall surface of the buffer chamber, the glove being configured to be used to access from outside to inside the buffer chamber.

8. The AM system according to claim 1, further comprising a movement mechanism configured to be used to move goods between the buffer chamber and the fabrication chamber.

9. The AM system according to claim 1, wherein the buffer chamber is connected to a gas supply line for supplying insert gas into the buffer chamber.

10. The AM system according to claim 1, wherein the buffer chamber is movable between a first position, at which the exit is in communication with the second gate, and a second position, at which the entrance is in communication with the first gate.

\* \* \* \* \*